Jan. 14, 1936.   W. RAISCH   2,027,652
FILTER
Filed April 25, 1935
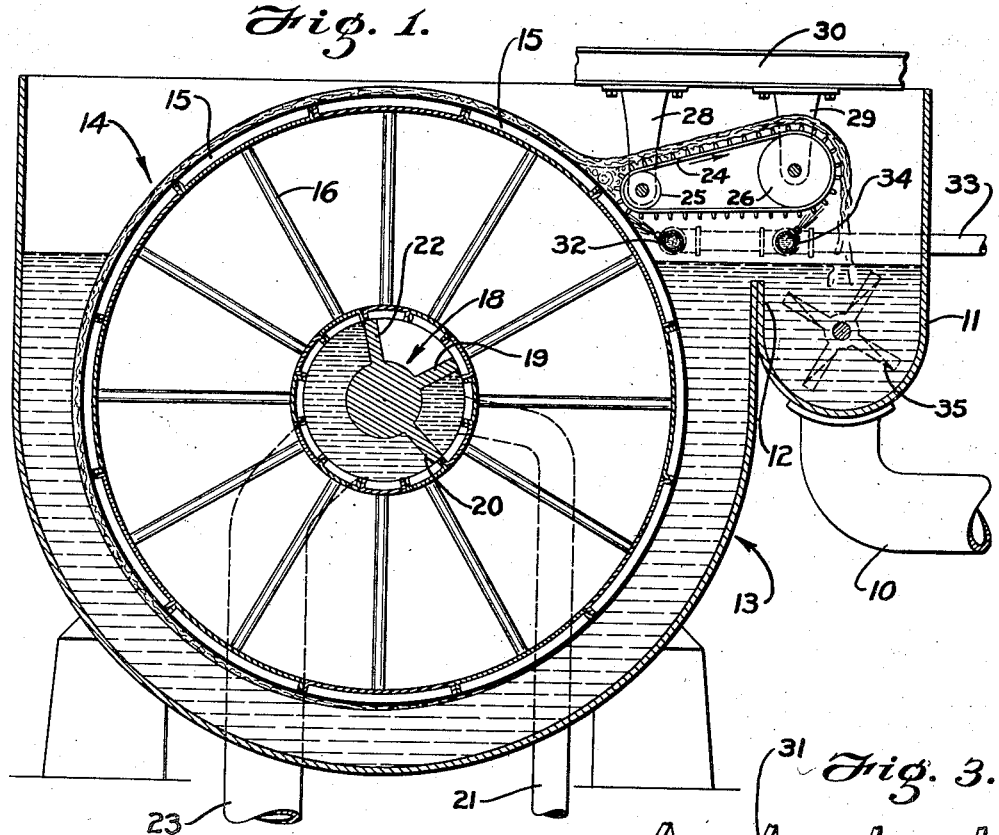
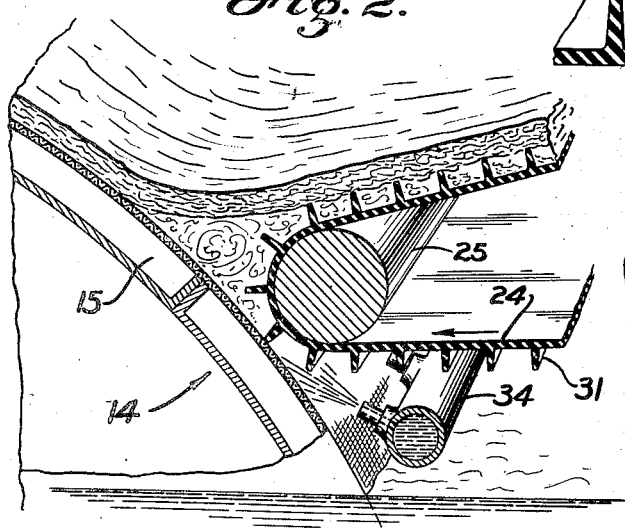
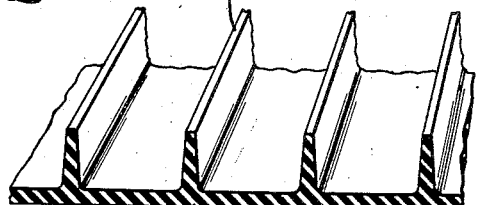
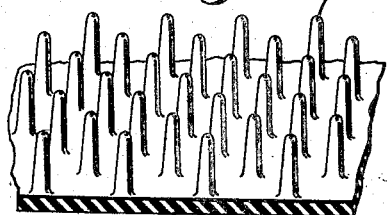
INVENTOR
William Raisch
BY
Louis L. Amart
his ATTORNEY Patented Jan. 14, 1936

2,027,652

UNITED STATES PATENT OFFICE 2,027,652

FILTER

William Raisch, Forest Hills, N. Y., assignor to Municipal Sanitary Service Corporation, New York, N. Y., a corporation of New York Application April 25, 1935, Serial No. 18,087

4 Claims. (Cl. 210—201)

The present invention relates to filters of the rotary type and more particularly to means for stripping filter cake from the drum of a rotary filter.

The main object of the invention relates to the provision of a novel and advantageous form of filter cake stripping means. Other features of the invention relate to simplicity of construction, effectiveness of operation and economy of manufacture and maintenance.

According to one way of carrying out the invention use may be made of a stripper in the form of a continuous belt or apron passing around rotary supports or rolls, one of which is located close to the surface of the filter drum above the level of the liquid in the filter tank or pan so that members projecting from the belt so as to engage the filter cloth or other material at the surface of the drum may strip the filter cake therefrom, preferably with a spray of water directed upwardly between the filter drum and the stripper belt. The belt may be provided with stripping members in the form of ribs extending transversely of the belt and serving to wipe the filter cake, which is at the same time loosened and softened by the water spray, from the filter drum and convey it therefrom to any desired position. It will be evident that by this form of stripping device the cake can be removed from the drum near the top thereof and discharged at substantially any desired level. It may also be desirable to use a water spray in connection with the discharge of the cake. It will be evident that the stripping means of the present invention is particularly adapted for use in connection with apparatus in which the filter cake is repulped after stripping and returned to the sewage stream on its way to the filter. Apparatus of this general type is illustrated in the Raisch & Wright Patent No. 1,937,481, Nov. 28, 1933.

Other objects, features and advantages will appear upon consideration of the following description and of the drawing, in which Fig. 1 is a view in vertical section of apparatus embodying one form of the invention;

Fig. 2 is a fragmentary perspective view on a larger scale showing the stripping action;

Fig. 3 is a fragmentary prospective view of one form of belt having stripping devices thereon; and Fig. 4 is a view similar to Fig. 3 but showing a modified form of belt.

Referring to Fig. 1, the liquid to be filtered, such as sewage, is supplied through a pipe 10 to a trough 11 and passes therefrom over a discharge or overflow walls 12 into the tank or pan 13 of a rotary filter. Partially submerged in the liquid of the filter pan is a drum 14 formed at its periphery with a plurality of compartments 15 having at their outer sides filter means, which may include filter cloth, and connected by pipes 16 to one or more rotary hubs, each of which cooperates with a fixed valve member 18 provided with partitions 19 and 20 setting off a cloudy filtrate chamber from which the cloudy filtrate is drawn off through a suction or vacuum pipe 21. The vacuum action in the pipe 21 may be effected in any suitable manner, as by utilizing the pipe 21 as barometric leg. Each member 18 is also provided with a partition 22 which together with the partition 20 sets off a clear filtrate chamber from which the clear filtrate may be withdrawn through a section of vacuum pipe 23 which may also serve as a barometric leg. It will be seen that, as the drum rotates in a clockwise direction, a cake will begin to form on the filter cloth or other mediums as soon as the various compartments move into the liquid in the filter pan and this cake will gradually increase in thickness until it is raised out of the liquid in the pan. With the partition 22 in the position shown in Fig. 1, the cake will be dried after being moved out of the liquid and will then be advanced under atmospheric pressure beyond the top of the drum to a suitable place for stripping.

According to the form illustrated in Figs. 1, 2 and 3, the stripping means comprising an endless belt 24 passing around rotatable supporting members 25 and 26 supported in any suitable manner as by means of hangers 28 and 29 projecting downwardly from a beam or beams 30, the rotatable member 25 being relatively close to the filter drum 14. The belt 24 may be provided with ribs or wipers 31 to engage the filter medium at the surface of the drum and convey the cake outwardly along the upper reach of the belt, the separation of the cake from the drum being facilitated by a spray thrown upwardly along the drum from a spray device 32 comprising a pipe extending along the drum and provided with outlets or nozzles at suitable intervals. The water for the jet device 32 may be supplied through a pipe 33 which may also be used to furnish water to a jet device 34 so arranged as to assist in discharging the cake from the belt 24 as the latter passes downwardly around the rotatable member 26. From the belt 24 the cake falls into the trough 11 where it is mixed or repulped with the incoming sewage by means of a beater 35.

In the usual operation of the apparatus, a charge of suitable cake-forming material is placed in the filter pan 13 to assure the formation of a suitable cake to obtain proper clarification of the filtrate. Then as the filter drum revolves in clockwise direction (Fig. 1) each peripheral compartment 15 as it enters the liquid is subjected to the action of the cloudy filtrate barometric leg 21 and the filter cake begins to build up at the outer side of the compartment. At this time, however, the filter cake is so thin that various particles pass into the compartment and the filtrate at this time is cloudy. When, however, the compartment passes into the zone of influence of the clear filtrate barometric leg 23 the cake is of sufficient thickness to prevent the passage of solids of appreciable size therethrough and the resulting filtrate is clear. After leaving the liquid the compartment is still subjected to vacuum action and the cake at the surface thereof is dried. From the drying zone the compartment passes into an atmospheric pressure zone and while in this zone the cake is removed by the stripping means, the cake being loosened by the water spray or jets from the device 32 and then picked up by the ribs 31 of the belt 24 by which the stripped cake is carried to a position over the repulping trough 11 into which it is discharged with the assistance of the water flowing in jets from the device 34. With this arrangement it will be evident that the cake forming material originally placed in the filter pan 13 may be used and reused indefinitely. As illustrated in Fig. 2, after the discharge of the cake over the belt 24 has been started the cake will pass directly to the upper reach of the belt without being scraped from the belt by the ribs or wipers 31, the space between the cake, the rotary member 25 and the drum being filled with water and material removed directly from the drum by the ribs 31.

In Fig. 4 there is illustrated a second form of belt 24a from outer face of which project fingers 31a. The action of this form of belt in the stripping operations will be substantially the same as that of the belt shown in Figs. 1, 2 and 3 except that the filter cloth at the periphery of the filter drum will not be wiped or brushed continuously from one end of the drum to the other.

It will be evident that the belts shown in Figs. 3 and 4 may be made advantageously either from rubber or rubberized material and also in other ways.

It should be understood that changes may be made in various features of the invention and that certain features may be used without others without departing from the true scope and spirit of the invention.

Having thus described my invention, I claim:

1. The method of removing cake from the drum of a rotary filter which comprises throwing a liquid spray on the peripheral surface of the drum in a direction opposite to the direction of movement of said surface and removing cake in a continuous sheet from said peripheral surface by a rearward and outward brushing action on said peripheral surface in advance of the spraying action.

2. In a rotary filter, the combination with a rotary filter drum, of means for stripping filter cake from the downwardly moving side of the drum including a conveyor belt to receive cake from the drum, transverse ribs on said belt to brush material from the peripheral surface of the drum, and means beneath the conveyor for throwing a liquid spray upwardly between the conveyor belt and the filter drum.

3. In a rotary filter, the combination with a rotary filter drum, of means for stripping filter cake from the downwardly moving portion of the drum including a conveyor belt to receive cake from the drum, flexible fingers on said belt to brush material from the peripheral surface of the drum, and means beneath the conveyor belt for throwing a liquid spray upwardly between the conveyor and the filter drum.

4. In a rotary filter, the combination with a rotary filter drum, of means for stripping filter cake from the downwardly moving portion of the drum including a conveyor belt to carry stripped cake away from the drum, means on the conveyor belt to brush cake from the surface of the drum, and means for throwing a liquid spray upwardly between the conveyor belt and the filter drum.

WILLIAM RAISCH.